United States Patent

Goñi et al.

[11] Patent Number: 6,035,215
[45] Date of Patent: Mar. 7, 2000

[54] METHOD AND APPARATUS FOR PROVIDING CELLULAR RADIO SERVICE TO STANDARD ANALOG TERMINALS

[75] Inventors: Joaquín Ignacio Goñi, Barrika; Fernando Aguirre, Getxo; José Javier Jañez, Sopelana, all of Spain

[73] Assignee: Telefonaktiebolaget LM Ericsson, Stockholm, Sweden

[21] Appl. No.: 08/870,489

[22] Filed: Jun. 6, 1997

[51] Int. Cl.[7] .................................................. H04B 1/38
[52] U.S. Cl. ........................... 455/557; 455/554; 379/201
[58] Field of Search ................................. 455/74.1, 554, 455/422, 564, 567, 414, 416, 555, 565, 550, 410; 379/202, 203, 264, 265, 210, 201

[56] References Cited

U.S. PATENT DOCUMENTS

| | | | |
|---|---|---|---|
| 4,658,096 | 4/1987 | West, Jr. et al. | 455/422 |
| 4,718,080 | 1/1988 | Serrano et al. | 379/59 |
| 4,890,315 | 12/1989 | Bendixen et al. | 455/554 |
| 4,922,517 | 5/1990 | West, Jr. et al. | 455/74.1 |
| 4,959,851 | 9/1990 | Tobolski, Jr. et al. | 455/557 |
| 5,117,450 | 5/1992 | Joglekar et al. | 455/557 |
| 5,815,550 | 9/1998 | Miller | 379/37 |
| 5,841,837 | 11/1998 | Fuller et al. | 379/57 |
| 5,864,763 | 1/1999 | Leung et al. | 455/557 |

FOREIGN PATENT DOCUMENTS

96/15638  11/1995  WIPO .
96/32824   4/1996  WIPO .

*Primary Examiner*—Reinhard J. Eisenzopf
*Assistant Examiner*—Greta J. Fuller
*Attorney, Agent, or Firm*—Burns, Doane, Swecker & Mathis, L.L.P.

[57] ABSTRACT

A method and apparatus to set up a call between at least one standard analog terminal and a remote terminal, via a radio terminal or access a remote terminal or request a service in the network, via a radio terminal, while the radio terminal is engaged in a conversation with another remote terminal in the network. To access the remote terminal or request a service in the network, while the radio terminal is engaged in a conversation with another remote terminal in the network: clear the contents of the memory, wherein a first dialed digit is received from the standard analog terminal, the radio terminal instructs the termination of call set up processing, the first dialed digit is stored in the memory, the first dialed digit forms the contents of the memory, a number is then formed to represent the remote terminal from the contents of the memory, the radio terminal is then instructed to initiate call set up processing using the number, a subsequent dialed digit is received from the standard analog terminal, the radio terminal is instructed to terminate call set up processing, and the subsequently dialed digit is stored in the memory, wherein together with the contents of the memory, updated contents are formed, a new number representing the remote terminal is formed from the updated contents of the memory, the radio terminal is instructed to initiate call set up processing using the new number, and wherein the procedure is repeated.

12 Claims, 5 Drawing Sheets

METHOD AND APPARATUS FOR PROVIDING CELLULAR RADIO SERVICE TO STANDARD ANALOG TERMINALS

BACKGROUND OF THE INVENTION

This invention relates to a method and apparatus for cellular communication. More particularly, this invention relates to a method and apparatus for setting up a call between at least one standard analog terminal and a remote terminal in a network, via a radio terminal, or accessing a remote terminal or requesting a special service in a network from at least one standard analog terminal, via a radio terminal, while the radio terminal is engaged in a conversation with another remote terminal in the network.

Cellular radio telephone systems provide for communication among mobile stations and fixed telephone networks. Typically, a cellular system includes cellular transceivers or terminals connected to a Radio Base Station (RBS) that enables calls to be transmitted to and received from the cellular network via a Base Station Controller (BSC) and a Mobile Switching Center (MSC).

A standard Plain Old Telephone System (POTS) telephone can be interfaced with a fixed cellular terminal (FCT) so that a call can be set up at or received by the POTS telephone terminal via the FCT, avoiding the need for wiring the POTS telephone to a local exchange. The FCT alerts the POTS telephone when an incoming call is received, causing the POTS telephone to ring. The FCT is typically implemented with a modified cellular radio terminal that provides the line card functions normally provided by the local exchange in the POTS.

A difficulty that arises in interfacing standard POTS telephones with FCTs is that the procedure by which a telephone connection is established in a POTS is different from the procedure by which a connection is established in a cellular radio telephone system.

In a POTS, the line card in the local exchange provides a dial tone when the POTS telephone goes off-hook. After the first dialed digit is received in the line card from the POTS telephone, the dial tone is terminated, and the line card continues to receive subsequently dialed digits in sequence, passing them directly to the group switch. The group switch analyzes the dialed digits and makes a connection to the telephone terminal corresponding to the dialed digits, if the sequence of dialed digits is valid. If a complete or valid dialing sequence is not received by the group switch before a timer has expired, the group switch releases the connection, and the line card sends a busy signal or an error signal to the POTS telephone.

In contrast, in a cellular radio telephone system, a subscriber uses the keypad of a cellular terminal, such as a mobile telephone, to enter dialed digits into a memory and then presses a dedicated 'SEND' key which initiates call set up processing. In the cellular terminal, call set up processing generally begins by scanning for control channels broadcast by the RBS, locking onto one of the available control channels, and receiving and decoding overhead information. The cellular terminal then transmits a random access message to the RBS requesting call set up. The request usually involves some type of authentication handshake between the RBS and the cellular terminal. After authentication and further communication, a voice channel is eventually opened, and the call is completed. The details of call set up processing vary depending upon the air interface standard (e.g., AMPS, TACS, GSM, IS-136, IS-95, etc.) employed by a particular cellular system.

A problem encountered when interfacing a POTS telephone with an FCT is that a POTS telephone does not have a 'SEND' key. Thus, some other way must be provided for a POTS telephone to initiate the call set up processing in the FCT.

Several systems have been proposed for overcoming this problem of interfacing a standard POTS telephone with an FCT. For example, U.S. Pat. No. 4,718,080 to Serrano discloses a system in which, after a telephone number is dialed at a standard POTS telephone, a 'SEND' signal is simulated, and the dialed digits are transmitted to the cellular terminal. Dialing sequences can also be entered at the standard POTS telephone to control features of the standard POTS telephone, such as volume control. U.S. Pat. No. 4,658,096 to West, Jr. et al. and its related patents disclose a system in which a 'SEND' signal is transmitted to a cellular terminal after the last digit has been dialed at the standard POTS telephone. The system determines whether the last digit has been dialed based on a logical analysis of the dialed digits or on time elapsed after the last digit has been dialed. A problem with these approaches is that some sort of determining algorithm or a timer is required to determine when the last digit is dialed, which increases the cost and complexity of the FCT.

Systems employing predetermined dialing sequences to instruct a cellular terminal to perform certain functions are also known. For example, U.S. Pat. No. 4,959,851 to Tobolski, Jr. et al. discloses a system in which predetermined dialing sequences consisting of leading and trailing function digits are entered at a standard POTS telephone to select features of a cellular terminal. Other systems employ an End Of Number (EON) key method, in which the user explicitly decides when to send dialed digits to the cellular terminal by pressing a predetermined key. For example, U.S. Pat. No. 5,117,450 to Joglekar et al. discusses pressing "#" or "*" to send dialed digits to a cellular transceiver. A drawback of such systems is that they require the user to press a particular function key or key sequence, which can be cumbersome and easily forgotten.

Another proposed solution is a Digit by Digit method, in which a certain number of roamer ports are assigned in the MSC for the FCT subscribers. When a POTS telephone goes off hook, a call to one of the roamer ports in the MSC is automatically performed via an FCT. When a voice or traffic channel is assigned to the calling FCT, the MSC generates a dial tone that is sent to the FCT through the voice or traffic channel. The user then initiates dialing, and the dialed digits are sent as dual tone multi-frequency (DTMF) tones through the voice or traffic channel to the MSC. These dialed digits are stored in the roamer port, forming the complete called number. A problem with this approach is that it requires a change in the configuration of existing MSCs or the installation of new MSCs, which can be prohibitively expensive.

Thus, it is an objective of the present invention to provide an improved method and apparatus for setting up a call between at least one standard analog terminal and a remote terminal in a network, via a radio terminal, which overcomes the drawbacks mentioned above. It is also an objective of the present invention to provide an improved method and apparatus for accessing a remote terminal or requesting a service in a network from at least one standard analog terminal via a radio terminal, while the radio terminal is engaged in a conversation with another remote terminal in the network, which overcomes the drawbacks mentioned above.

SUMMARY

According to one embodiment of this invention, a method and apparatus are provided for setting up a call between at least one standard analog terminal and a remote terminal in a network via a radio terminal. The contents of a memory are cleared, and a first dialed digit is received from the standard analog terminal. The radio terminal is instructed to terminate call set up processing. The first dialed digit is stored in the memory, forming the contents of the memory. A number representing the remote terminal is formed comprising the contents of the memory. The radio terminal is instructed to initiate call set up processing using the number. If a subsequently dialed digit is received from the standard analog terminal, then the radio terminal is instructed to terminate call set up processing. The subsequently dialed digit is stored in the memory, together with the contents of the memory, to form updated contents. A new number is formed comprising the updated contents of the memory, and the radio terminal is instructed to initiate call set up processing using the new number. The steps of receiving a subsequently dialed digit, instructing the radio terminal to terminate call set up processing, storing the subsequently dialed digit in the memory, together with the contents of the memory, to form updated contents, forming a new number comprising the updated contents, and instructing the radio terminal to initiate call set up processing using the new number are repeated for each subsequently dialed digit, as long as the subsequently dialed digit is received before a call set up request is sent to the network.

According to another embodiment of this invention, a method and apparatus are provided for accessing a remote terminal or requesting a service in a network from at least one standard analog terminal via a radio terminal, while the radio terminal is engaged in a conversation with another remote terminal in the network. A register recall indication is received from the standard analog terminal, and the contents of a memory are cleared. The radio terminal is then instructed to terminate flash access preparation. Next, the radio terminal is instructed to initiate flash access preparation with no dialed digits. If a first dialed digit is received from the standard analog terminal, then the radio terminal is instructed to terminate flash access preparation, and the first dialed digit is stored in the memory, forming the contents of the memory. A number representing the remote terminal or a requested service is formed comprising the contents of the memory. The radio terminal is instructed to initiate flash access preparation using the number. If a subsequently dialed digit is received from the standard analog terminal, then the radio terminal is instructed to terminate flash access preparation. The subsequently dialed digit is stored in the memory, together with the contents of the memory, to form updated contents. A new number is formed comprising the updated contents of the memory, and the radio terminal is instructed to initiate flash access preparation using the new number. The steps of receiving a subsequently dialed digit, instructing the radio terminal to terminate flash access preparation, storing the subsequently dialed digit in the memory, together with the contents of the memory, to form updated contents, forming a new number comprising the updated contents, and instructing the radio terminal to initiate flash access preparation using the new number are repeated for each subsequently dialed digit, as long as the subsequently dialed digit is received before a flash request is sent to the network.

BRIEF DESCRIPTION OF THE DRAWINGS

Exemplary embodiments of the invention will now be described in more detail with reference to the accompanying drawings, in which like descriptive labels are used to refer to similar elements.

DETAILED DESCRIPTION

In the following description, for purposes of explanation and not limitation, specific details are set forth, such as particular circuits, circuit components, techniques, etc., in order to provide a thorough understanding of the invention. However, it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1:
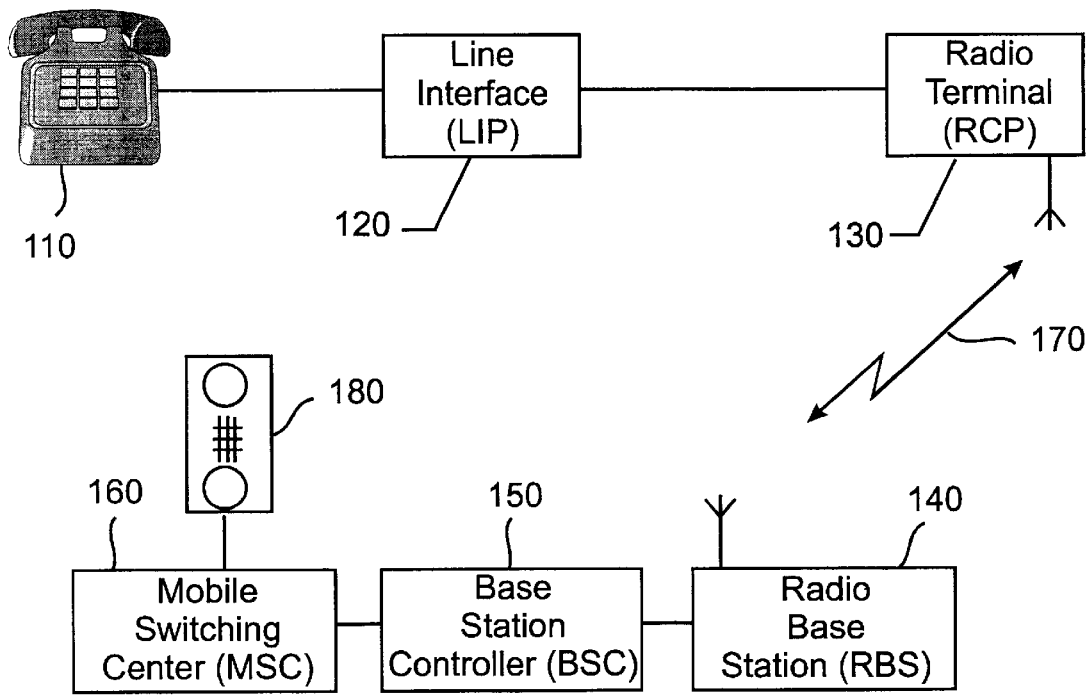
FIG. 1 is a functional block diagram illustrating an exemplary interconnection between a POTS telephone and a cellular radio communication system.

FIG. 1 is a functional block diagram illustrating an exemplary interconnection between a POTS telephone and a cellular radio communication system. A Line Interface Processor (LIP) 120 provides an interface between a POTS telephone 110 and a Radio Terminal (RCP) 130. Only one POTS telephone 110 is shown in FIG. 1 for ease of illustration. However, any number of POTS telephones can be connected to the LIP 120. The POTS telephone 110 is illustrated in FIG. 1 as one example of a standard analog terminal. Although not shown, the present invention is applicable to any type of analog terminal, e.g., a facsimile terminal, a modem, or an Integrated Services Digital Network (ISDN) terminal.

The LIP 120 and the RCP 130 form an FCT. While shown as separate functional blocks for simplicity, the LIP 120 and the RCP 130 can be included in a single device. Additionally, all or some of the functions provided by the LIP 120 can, alternately, be performed by the RCP 130.

Speech and data are transmitted between the RCP 130 and the POTS telephone 110 via the LIP 120. The RCP 130, in turn, transmits and receives data and speech to and from a remote terminal 180 in a network via a radio air interface 170, a RBS 140, a BSC 150, and a MSC 160. The remote terminal 180 can be any type of terminal in any type of telecommunication network. Although only one remote terminal 180 is shown in FIG. 1, the present invention is applicable to any number of remote terminals.

Figure 2:
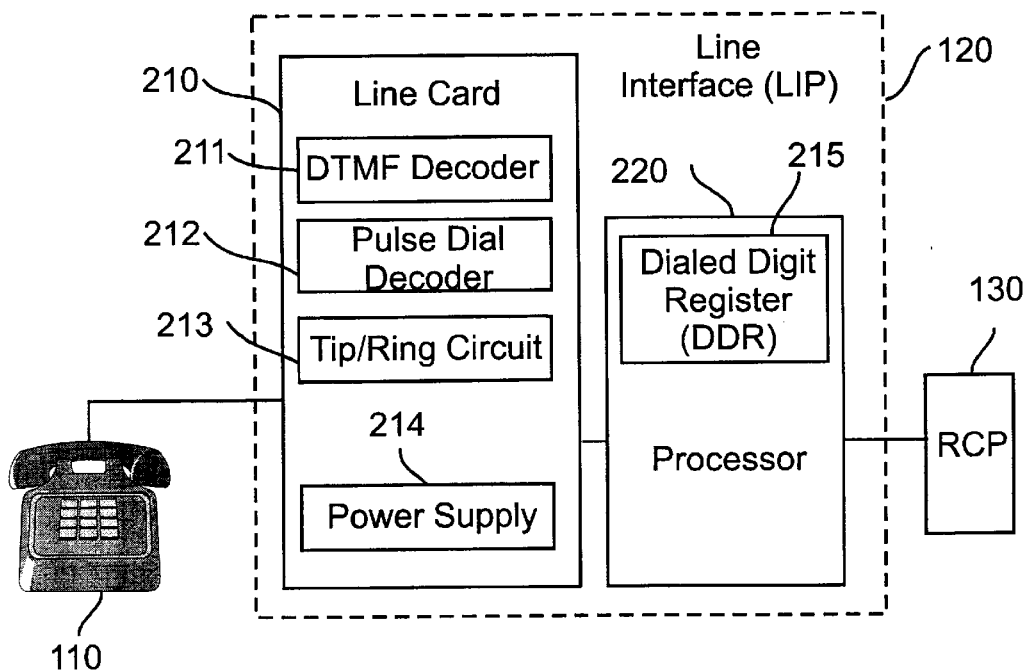
FIG. 2 is a functional block diagram illustrating a line interface processor according to an exemplary embodiment of the present invention.

FIG. 2 illustrates the LIP 120 in greater detail. The LIP 120 comprises a Line Card 210 and a Processor 220.

Although shown as separate devices, the LIP 120 and the Processor 220 can be included in a single device.

The Line Card 210 includes a DTMF Decoder 211 for receiving and decoding dialed digits in the form of DTMF tones corresponding to specific keys pressed on the POTS telephone 110. The Line Card 210 also includes an optional Pulse Dial Decoder 212 to accommodate analog rotary telephone terminals. The Line Card 210 further includes a Tip/Ring circuit 213 which sends a ring signal to the POTS telephone 110 in response to an incoming call from the RCP 130 and monitors the hook switch status of the POTS telephone 110 to detect when the POTS telephone goes on or off hook. The Line Card 210 also includes a Power Supply 214 which provides DC power to the POTS telephone 110.

The Processor 220 receives dialed digits from the Line Card 210 and stores each dialed digit in a Dialed Digits Register (DDR) 215. As each dialed digit is received, it is appended to dialed digits previously stored in the DDR 215. Although shown as part of the processor 220, the DDR 215 can be implemented as a separate device. Also, the DDR 215 is shown as an example of a storage device, and the dialed digits can be stored in any type of memory.

The Processor 220 also sends and receives messages to the RCP 130 regarding call setup, retrieves stored dialed digits from the DDR 215, and transmits the stored dialed digits to the RCP 130. The Processor 220 can be implemented with, for example, a conventional programmable microprocessor.

Figure 3A:
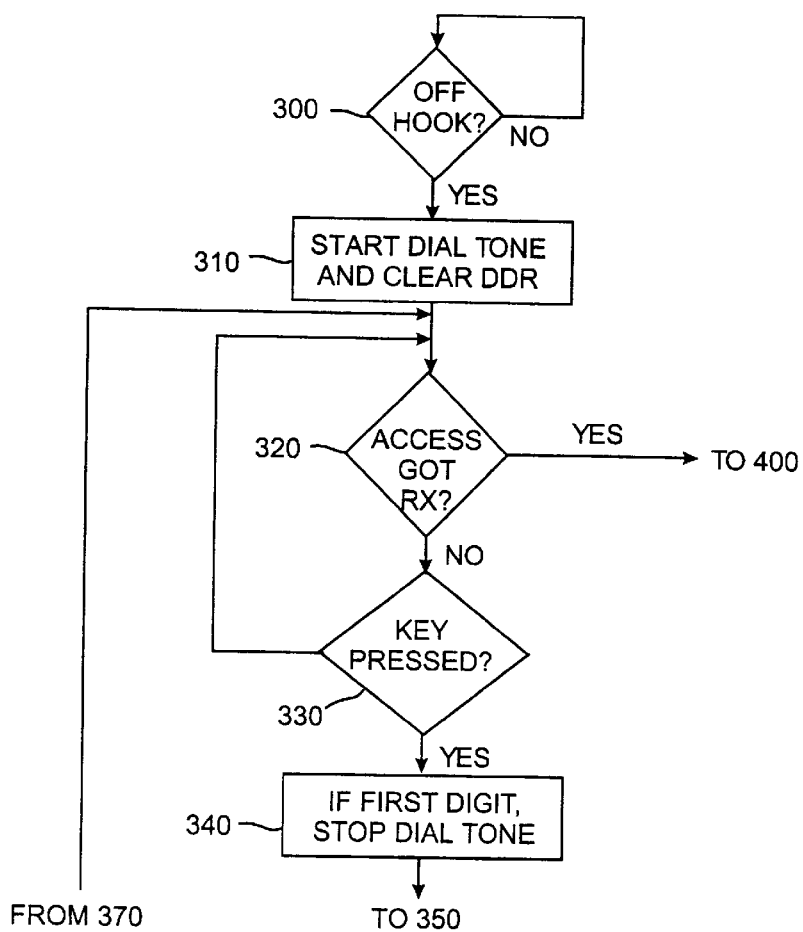
FIG. 3A is a flowchart illustrating an exemplary dialed digit transfer process when the RCP is initially in an idle state.

FIG. 3A illustrates an exemplary dialed digit transfer process performed by the Processor 220 when the RCP 130 is initially in an idle state. The process begins at step 300 at which the Line Card 210 monitors the hook switch status of the POTS telephone 110 to determine if the POTS telephone is off-hook. If the POTS telephone 110 is determined not to be off-hook, step 300 is repeated, and the Line Card 210 continues monitoring the hook switch status. When the Line Card 210 determines that the POTS telephone 110 is off-hook, for example because the subscriber has lifted the receiver, the process proceeds to step 310 at which the Line Card 210 provides a dial tone to the POTS telephone 110 and sends an off-hook indication to the Processor 220. Upon receipt of the off-hook indication, the Processor 220 clears the DDR 215.

Next, at step 320, the Processor 220 determines whether the RCP 130 has transmitted an 'ACCESS GOT' message, indicating that system access has been established, and no more digits will be accepted from the POTS telephone 110. The 'ACCESS GOT' message is sent after the RCP 130 has completed call set up processing, or at least has reached a point during processing after which dialed digits cannot be accepted, i.e., a "point of no return" at which the RCP 130 has begun to transmit a request for call set up on an uplink control channel to the network.

Figure 4A:
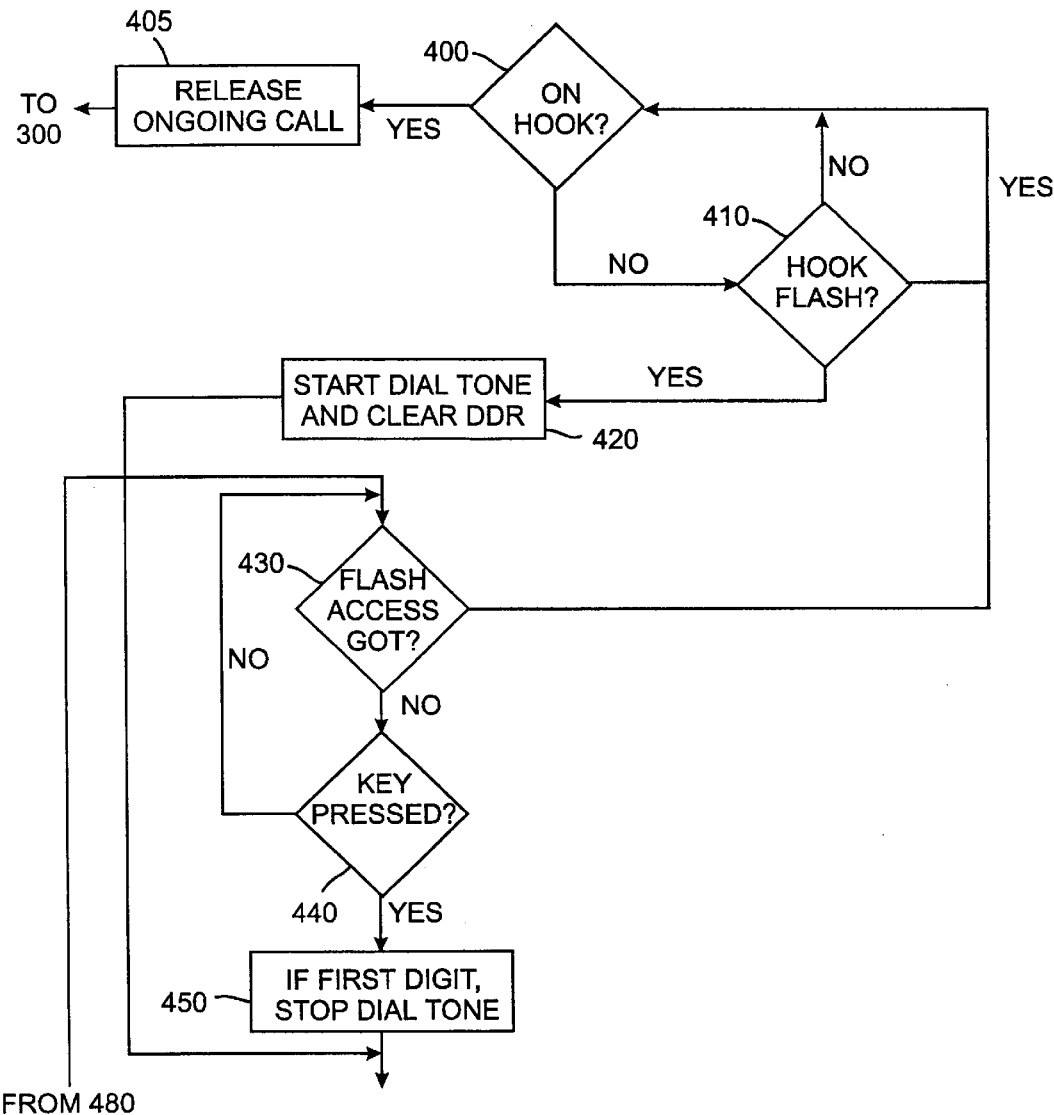
FIG. 4A is a flowchart illustrating an exemplary register recall process when the RCP is initially in a conversation state.

If the Processor 220 determines that an 'ACCESS GOT' message has been received, the process proceeds to step 400 shown in FIG. 4A. If the Processor 220 determines that an 'ACCESS GOT' message has not been received, the Line Card 210 next detects whether a DTMF tone (or, alternately, a pulsed-dial signal) has been received, indicating that a key on the POTS telephone 110 has been pressed (step 330). If a key has not been pressed, the process returns to step 320. If a key has been pressed, the process proceeds to step 340. At step 340, the dial tone is stopped if the key pressed corresponds to a first digit dialed. The DTMF Decoder 211 determines which key was pressed (i.e., which digit was dialed) and presents the dialed digit to the Processor 220.

Figure 3B:
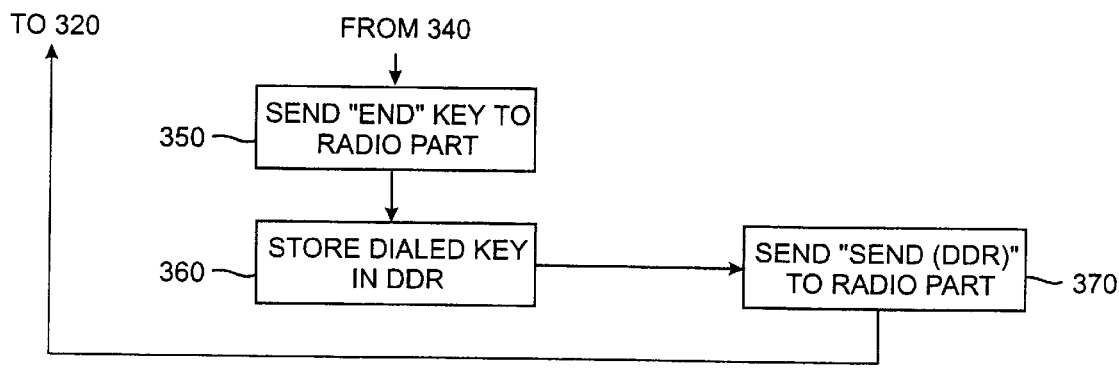
FIG. 3B is a flowchart illustrating an exemplary END-STORE-SEND routine when the RCP is initially in an idle state.

When the Processor 220 receives the dialed digit, the Processor executes the END-STORE-SEND routine shown in FIG. 3B.

Referring to FIG. 3B, the END-STORE-SEND routine begins at step 350 at which the Processor 220 sends an 'END' message to the RCP 130, instructing the RCP to discontinue call set up processing. The first time this message is received, the RCP 130 is not executing call set up processing, and thus the RCP ignores the instruction.

After the 'END' message is sent, the process proceeds to step 360 at which the Processor 220 stores the dialed digit in the DDR 215. For the first dialed digit, the DDR 215 is empty. Each consecutively dialed digit is appended to the dialed digits previously stored in the DDR 215. Next, at step 370, the stored dialed digits are fetched from the DDR 215, and a 'SEND' message is transmitted to the RCP 130, the 'SEND' message instructing the RCP 130 to initiate call set up processing and containing the stored dialed digits. From there, the process returns to step 320 in FIG. 3A.

Upon receipt of the 'SEND' message, the RCP 130 initiates call set up processing, which is performed according to known techniques suited to the particular air interface standard employed in the cellular system. In general, call set up processing begins by scanning for available control channels broadcast by the RBS 140 and decoding overhead information. During call set up processing, the RCP 130 continuously monitors the LIP 120 to determine whether an 'END' message has been transmitted by the LIP 120. If an 'END' message has been transmitted by the LIP 120, the RCP 130 terminates the call set up processing.

FIG. 4A illustrates an exemplary register recall process performed by the Processor 220 when the RCP 130 is initially in a conversation state. The process begins at step 400 at which the Line Card 210 monitors the hook switch status of the POTS telephone 110 to determine if the POTS telephone is on-hook. If the POTS telephone 110 is determined to be on-hook, the Processor 220 instructs the RCP 130 to release the ongoing call at step 405, and the process proceeds to step 300 in FIG. 3A. If the POTS telephone 110 is determined not to be on-hook, the process proceeds to step 410 at which the Line Card 210 determines whether a hook flash has been received from the POTS telephone 110 indicating that a register recall has been requested to invoke a special service, e.g., a third party conference call or acceptance of a waiting call. If a hook flash has not been received, the process returns to step 400. If a hook flash has been received, the process proceeds to step 420 at which the Line Card 210 provides a dial tone to the POTS telephone 110 and sends a register recall indication to the Processor 220. Upon receipt of the register recall indication, the Processor 220 clears the DDR 215 and executes the END-STORE-SEND routine shown in FIG. 4B, as explained below, with no dialed digits. That is, the Processor 220 transmits an 'END FLASH' message to the RCP 130, instructing the RCP 130 to end flash access preparation. The first time this message is received, the RCP 130 is not executing flash access preparation, and thus the RCP ignores the instruction. Then, the Processor 220 transmits a 'SEND FLASH' message containing no digits to the RCP 130, instructing the RCP to initiate flash access preparation.

Next, at step 430 the Processor 220 determines whether a 'FLASH ACCESS GOT' message has been received from the RCP 130 indicating that flash access has been established, and no more digits will be accepted from the POTS telephone 110. The 'FLASH ACCESS GOT' message is sent after the RCP 130 has reached a point during flash access preparation after which dialed digits will not be accepted, i.e., a "point of no return" at which the RCP has begun to transmit a flash request to the network.

If the Processor 220 determines that a 'FLASH ACCESS GOT' message has been received, the process returns to step 400. If the Processor 220 determines that a 'FLASH ACCESS GOT' message has not been received, the Line Card 210 next detects whether a DTMF tone (or, alternatively, a pulsed-dial signal) has been received, indicating that a key on the POTS telephone 110 has been pressed (step 440). If a key has not been pressed, the process returns to step 430. If a key has been pressed, the process proceeds to step 450. At step 450, the dial tone is stopped, if the key pressed corresponds to a first digit dialed. The DTMF decoder 211 determines which key was pressed (i.e., which digit was dialed), and the dialed digit is presented to the Processor 220. When the Processor 220 receives the dialed digit, the Processor executes the END-STORE-SEND routine shown in FIG. 4B.

Figure 4B:
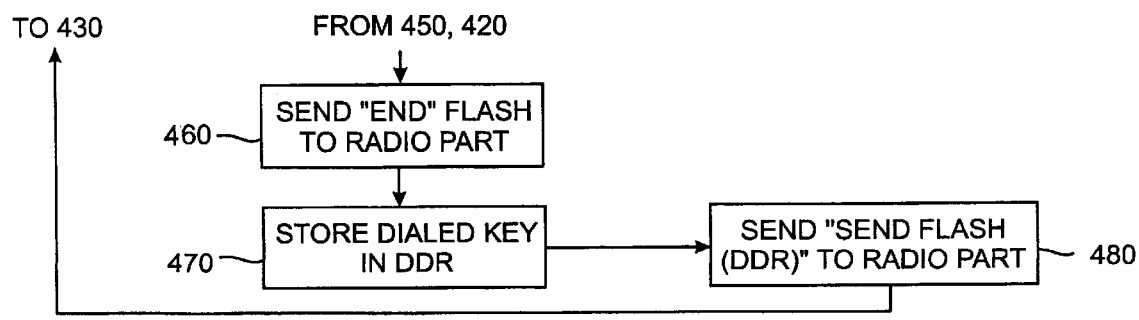
FIG. 4B is a flowchart illustrating an exemplary END-STORE-SEND routine when the RCP is initially in a conversation state.

Referring to FIG. 4B, the Processor 220 first sends an 'END FLASH' message to the RCP 130 at step 460. The 'END FLASH' message instructs the RCP 130 to discontinue flash access preparation.

After the 'END FLASH' message is sent, the process proceeds to step 470 at which the Processor 220 stores the dialed digit in the DDR 215. The dialed digit is appended to dialed digits previously stored in the DDR 215. Next, at step 480, the stored dialed digits are fetched from the DDR 215, and a 'SEND FLASH' message is transmitted to the RCP 130, the 'SEND FLASH' message instructing the RCP 130 to. initiate flash access preparation and containing the stored dialed digits. From there, the process returns to step 430 in FIG. 4A.

Figure 5A:
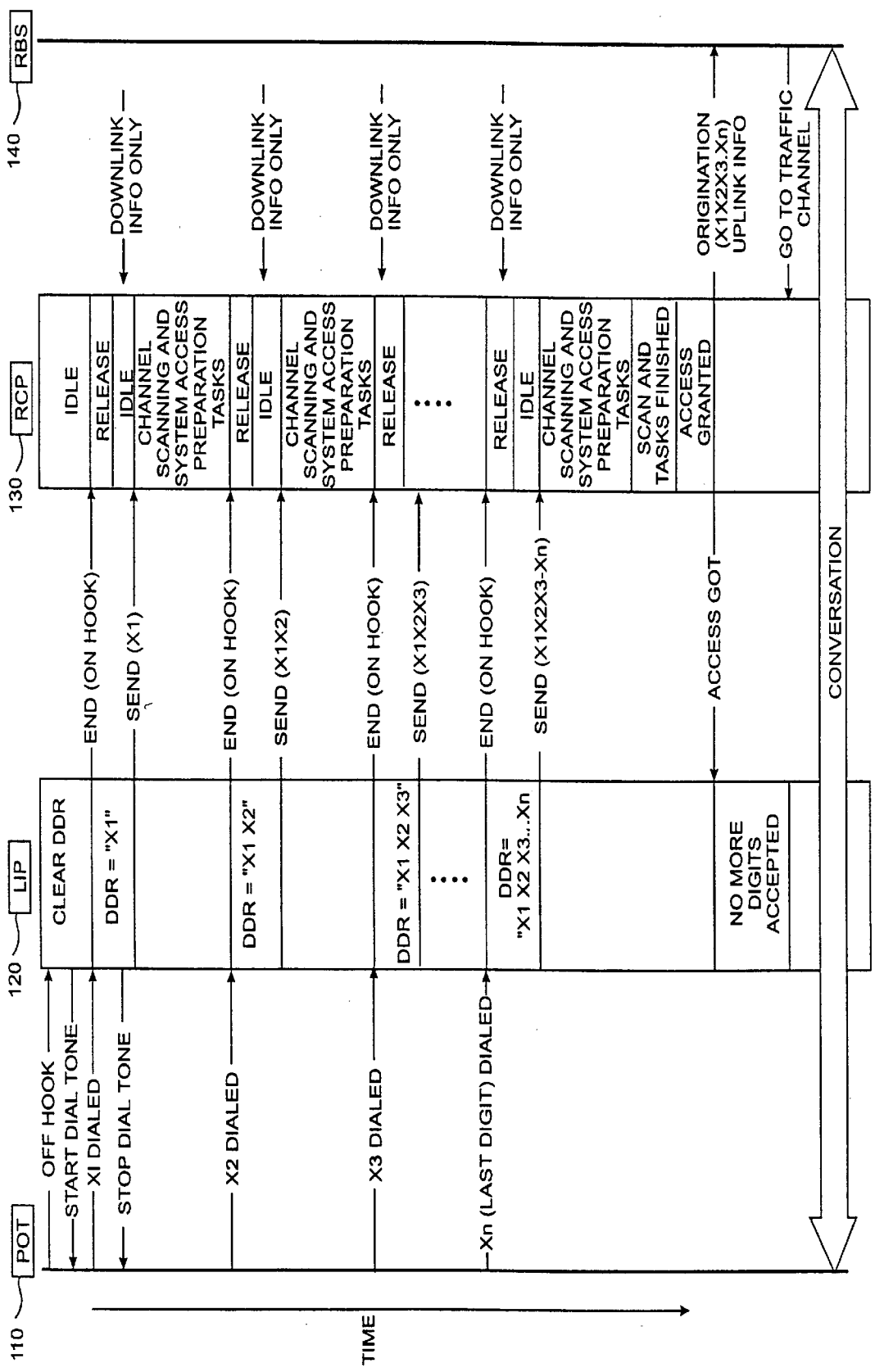
FIG. 5A illustrates an exemplary process for setting up a call using the END-STORE-SEND routine when the RCP is initially in an idle state.
Figure 5B:
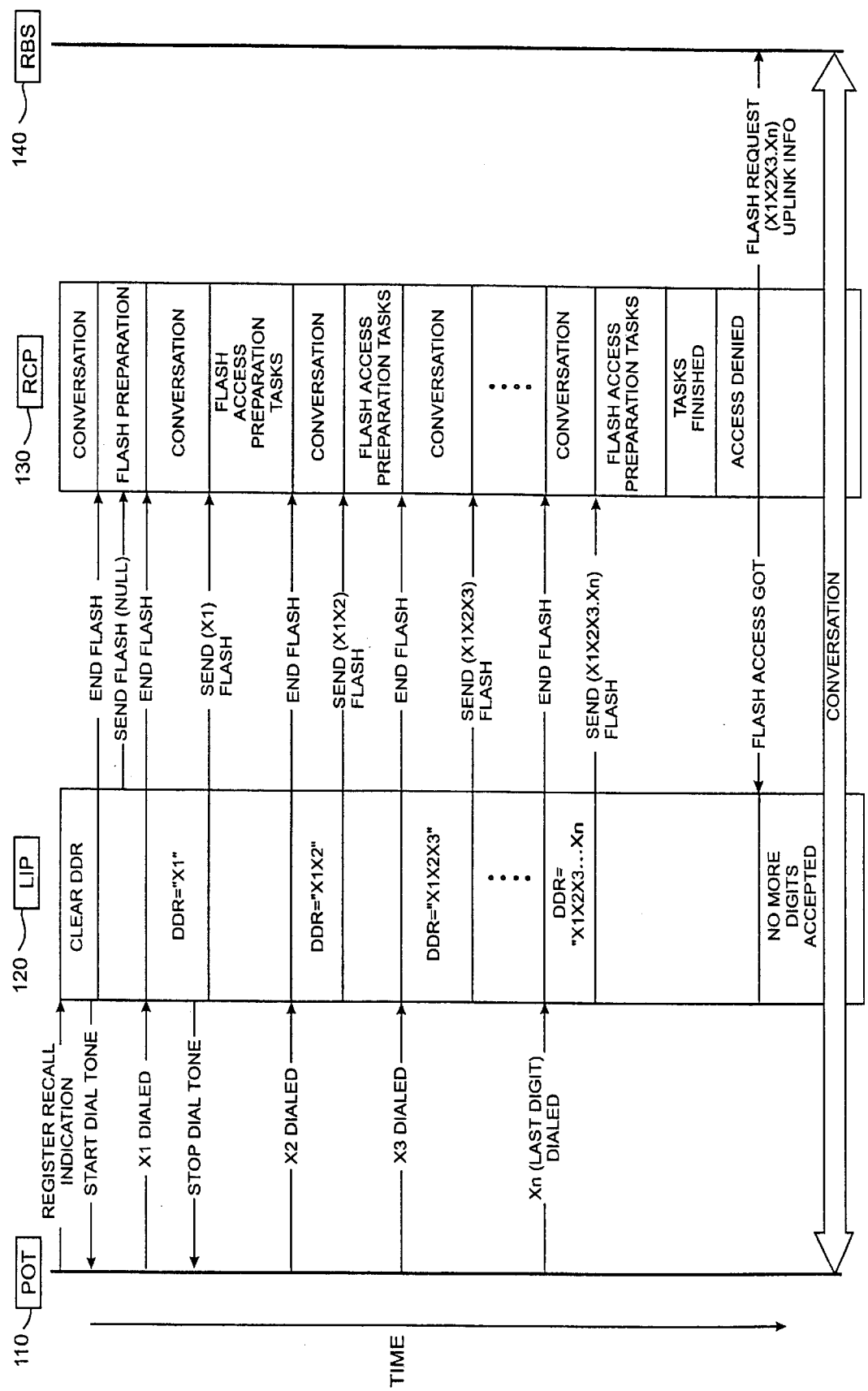
FIG. 5B illustrates an exemplary process for accessing a remote terminal or requesting a special service using the END-STORE-SEND routine when the RCP is initially in a conversation state.

FIGS. 5A and 5B illustrate how the END-STORE-SEND routine is used to set up a call and to access a remote terminal or request a service, respectively, via a radio terminal. The processes in FIGS. 5A and 5B are both represented on a time axis.

Referring to FIG. 5A, a process for setting up a call when the RCP 130 is initially in an idle state begins with the POTS telephone 110 indicating to the LIP 120 that it has gone off hook. The LIP 120 clears the DDR 215 and provides a dial tone to the POTS telephone 110. At this point, dialing has not initiated yet, and the RCP 130 remains idle.

Next, the POTS telephone 110 transmits a first dialed digit, X1, to the LIP 120. The LIP 120 stops the dial tone and sends an 'END' message to the RCP 130. The RCP 130 releases, i.e., terminates call set up processing if it is in progress, and returns to the idle state. While the RCP 130 is releasing, the LIP 120 stores the dialed digit, X1, in the DDR 215. Next, the LIP 120 transmits a 'SEND' message to the RCP 130, the 'SEND' message instructing the RCP 130 to initiate call set up processing and containing the dialed digit, X1. During this time, information is only transmitted across a downlink control channel from the RBS 140 to the RCP 130. Upon receipt of the 'SEND' message containing the dialed digit, X1, from the LIP 120, the RCP 130 performs call set up processing including channel scanning and system access preparation tasks.

Next, another digit, X2, is dialed and transmitted by the POTS telephone 110 to the LIP 120. Again, the LIP 120 sends an 'END' message to the RCP 130, and the RCP 130 releases and returns to the idle state. While the RCP 130 is releasing, the LIP 120 stores the dialed digit, X2, in the DDR 215, appending it to the previously stored dialed digit, X1. Next, the LIP 120 sends another 'SEND' message to the RCP 130, the 'SEND' message instructing the RCP 130 to initiate call set up processing and containing the stored dialed digits, X1X2. The RCP 130 continues only to receive information across a downlink control channel from the RBS 140. Next, the RCP 130 performs call set up processing.

This process is repeated for the next digit, X3, through a dialed digit, XN. After receipt of the 'SEND' message containing the dialed digits, X1X2X3 . . . XN, the RCP 130 sends a call set up request to the network. The RCP 130 sends an 'ACCESS GOT' message to the LIP 120 and an 'ORIGINATION' message containing the dialed digits X1X2X3 . . . XN across an uplink control channel to the RBS 140. At this point, the LIP 120 stops accepting digits from the POTS telephone 110. The RBS 140 assigns a traffic channel, if available, and the conversation proceeds across the assigned traffic channel.

FIG. 5B illustrates an exemplary process for accessing a remote terminal or requesting a service when the RCP 130 is initially in a conversation state. The process begins with the POTS telephone 110 indicating to the LIP 120 that it has detected a register recall indication, e.g., in response to the subscriber putting the receiver on hook for a short period of time or pressing an "R" key. The LIP 120 clears the DDR 215 and provides a dial tone to the POTS telephone 110. Next, the LIP 120 sends an 'END FLASH' instruction to the RCP 130 and then sends a 'SEND FLASH' message to the RCP 130 with no dialed digits, and the RCP 130 prepares for flash access.

Next, the POTS telephone 110 transmits a first dialed digit, X1, to the LIP 120. The LIP 120 stops the dial tone and sends an 'END FLASH' message to the RCP 130. The LIP 120 stores the dialed digit, X1, in the DDR 215. Next, the LIP 120 transmits a 'SEND FLASH' message to the RCP 130, the 'SEND FLASH' message instructing the RCP 130 to initiate flash access preparation and containing the first dialed digit, X1. Upon receipt of the 'SEND FLASH' message containing the dialed digit, X1, from the LIP 120, the RCP 130 prepares for flash access.

Next, another digit, X2, is dialed and transmitted by the POTS telephone 110 to the LIP 120. Again, the LIP 120 transmits an 'END FLASH' message to the RCP 130. The LIP 120 stores the dialed digit, X2, in the DDR 215, appended to the previously dialed digit, X1. Next, the LIP 120 transmits a 'SEND FLASH' message to the RCP 130, the 'SEND FLASH' message instructing the RCP 130 to initiate flash call set up processing and containing the stored dialed digits, X1X2. Next, the RCP 130 prepares for flash access.

This process is repeated for the next digit, X3, through a dialed digit, XN. After receipt of the 'SEND FLASH' message containing the dialed digits X1X2X3 . . . XN, the RCP 130 sends a 'FLASH ACCESS GOT' message to the LIP 120 and a 'FLASH REQUEST' message containing the dialed digits, X1X2X3 . . . XN, to the RBS 140 across the existing traffic channel. At this point the LIP 120 stops accepting digits from the POTS telephone 110, and the RBS 140 passes the 'FLASH REQUEST' message to the network. The action taken by the network depends on the service requested.

While the examples illustrated in FIG. 5A and FIG. 5B describe dialed digits X1X2X3 . . . XN for purposes of illustration, it should be understood that the present invention is applicable to zero, one, or any number of dialed digits.

According to the present invention, a user of any type of analog terminal can successfully set up a call to a remote terminal, access a remote terminal, or request a special service in a network via a radio terminal simply by dialing the number of the desired terminal or a number representing the service desired, provided the time between dialing digits does not exceed the time required for the radio terminal to prepare the sending of a call set up request or a flash request to the network. To the user, the operation of an analog terminal according to the present invention is the same as the operation of an analog terminal connected to a local exchange. The present invention can be employed in various types of existing cellular networks, without requiring a change in the architecture of the MSC's.

Examples of networks in which the present invention can be employed are ETACS and AMPS networks. In these networks, call set up processing includes a channel scanning stage during which the RCP 130 analyzes every channel in the set of control channels. The time needed to handle this task, as recommended by the network specification, ranges roughly between 1.5 and 3 seconds, but this time can be extended to 3 to 6 seconds or even longer. During this time, if the RCP 130 receives an 'END' message, the RCP returns to the initial idle state until another 'SEND' message is received to initiate call set up processing. There is ample time available for dialing between each digit.

It will be understood that the invention is not limited to the particular embodiments that are described and illustrated above. For example, although the embodiments are described above with reference to a cellular radio communication system, the present invention is applicable to any type of radio communication system. The specification contemplates any and all modifications that fall within the scope of the invention as defined by the following claims.

What is claimed is:

1. A method of setting up a call between at least one standard analog terminal and a remote terminal in a network via a radio terminal, the method comprising the following steps:
    a) clearing the contents of a memory;
    b) receiving a first dialed digit from the standard analog terminal;
    c) instructing the radio terminal to terminate call set up processing;
    d) storing the first dialed digit in the memory, wherein the first dialed digit forms the contents of the memory;
    e) forming a number representing the remote terminal from the contents of the memory;
    f) instructing the radio terminal to initiate call set up processing using the number;
    g) receiving a subsequently dialed digit from the standard analog terminal;
    h) instructing the radio terminal to terminate call set up processing;
    i) storing the subsequently dialed digit in the memory, together with the contents of the memory, to form updated contents;
    j) forming a new number representing the remote terminal from the updated contents of the memory;
    k) instructing the radio terminal to initiate call set up processing using the new number; and
    l) repeating the steps g–k.

2. The method of claim 1, wherein the steps g–k are repeated for each subsequently dialed digit as long as the subsequently dialed digit is received from the standard analog terminal before a call set up request is sent to the network from the radio terminal.

3. A method of accessing a remote terminal or requesting a service in a network from at least one standard analog terminal via a radio terminal, while the radio terminal is engaged in a conversation with another remote terminal in the network, the method comprised of the following steps:
    a) receiving a register recall indication from the standard analog terminal; b) clearing the contents of a memory; c) instructing the radio terminal to terminate flash access preparation; d) instructing the radio terminal to initiate flash access preparation; e) receiving a first dialed digit from the standard analog terminal; f) instructing the radio terminal to terminate flash access preparation; g) storing the first dialed digit in the memory, wherein the first dialed digit forms the contents of the memory; h) forming a number representing the remote terminal for the service requested from the contents of the memory; and i) initiating flash access preparation using the number.

4. The method of claim 3, further comprising the steps of:
    j) receiving a subsequently dialed digit from the standard analog terminal;
    k) instructing the radio terminal to terminate flash access preparation;
    l) storing the subsequently dialed digit in the memory, together with the contents of the memory, to form updated contents;
    m) forming a new number representing the remote terminal or the requested service from the updated contents of the memory;
    n) instructing the radio terminal to initiate flash access preparation using the new number; and
    n) repeating the steps j–n.

5. The method of claim 4, wherein the steps j–n are repeated for each subsequently dialed digit as long as the subsequently dialed digit is received from the standard analog terminal before a flash request is sent to the network from the radio terminal.

6. An apparatus for setting up a call between at least one standard analog terminal and a remote terminal in a network via a radio terminal, the apparatus comprising:
    a processor receiving a first dialed digit from the standard analog terminal and instructing the radio terminal to terminate call set up processing; and
    a memory storing the first dialed digit,
    wherein the memory is initially cleared, the first dialed digit forms the contents of the memory, and the processor forms a number representing the remote terminal from the contents of the memory and instructs the radio terminal to initiate call set up processing using the number, and
    wherein if subsequently dialed digits are received from the standard analog terminal, the processor instructs the radio terminal to terminate call set up processing, the contents of the memory are updated to include the subsequently dialed digits, and the processor forms a new number representing the remote terminal from the updated contents of the memory and instructs the radio terminal to initiate call set up processing using the new number.

7. The apparatus of claim 6, wherein for each subsequently dialed digit, the processor instructs the radio terminal to terminate call set up processing, the contents of the memory are updated to include the subsequently dialed digit, and the processor forms a new number representing the remote terminal from the updated contents of the memory and instructs the radio terminal to initiate call set up processing using the new number, as long as the subsequently dialed digit is received from the standard analog terminal before the radio terminal sends a request for call set up to the network.

8. An apparatus for accessing a remote terminal or requesting a service in a network from at least one standard analog terminal via a radio terminal, while the radio terminal is engaged in a conversation with another remote terminal in the network, the apparatus comprised of the following: a processor receiving a register recall indication from the standard analog terminal and instructing the radio terminal to terminate flash access preparation; a memory that is cleared upon receipt of the register recall indication by the processor, wherein, after the memory is cleared, the processor instructs the radio terminal to initiate flash access preparation wherein upon receipt of a first dialed digit, the processor instructs the radio terminal to terminate flash access preparation, the first dialed digit is stored in memory and forms the contents of the memory and the processor forms a number representing the remote terminal or the requested service from the contents of the memory and instructs the radio terminal to initiate flash access preparation using the number.

9. The apparatus of claim 8, wherein, subsequently dialed digits are received from the standard analog terminal, the processor instructs the radio terminal to terminate flash access preparation, the contents of the memory are updated to include the subsequently dialed digits, and the processor forms a new number representing the remote terminal or the requested service from the updated contents and instructs the radio terminal to initiate flash access preparation using the new number.

10. The apparatus of claim 9, wherein for each subsequently dialed digit, the processor instructs the radio terminal to terminate flash access preparation, the memory is updated to include the subsequently dialed digit, and the processor forms a new number representing the remote terminal or the requested service from the updated contents of the memory and instructs the radio terminal to initiate flash access preparation as long as the subsequently dialed digit is received from the standard analog terminal before the radio terminal sends a flash request to the network.

11. A method of establishing a connection between at least one standard analog terminal and a remote terminal in a network via a radio terminal, the method comprised of the following steps: a) instructing the radio terminal to terminate call set up processing upon receipt of a dialed digit from the standard analog terminal; b) storing the dialed digit in the memory associated with a Line Interface Processor, appending the dialed digit to previously stored dialed digits in the memory; c) sending all the stored dialed digits to the radio terminal with an instruction to initiate call set up processing; d) wherein steps a–c are repeated for each dialed digit received from the standard analog terminal, as long as the dialed digit is received before the radio terminal which sends a call set up request to the network.

12. A method of accessing a remote terminal or requesting a service in a network from a standard analog terminal via a radio terminal, while the radio terminal is engaged in a conversation with another remote terminal in the network, the method comprised of the following steps: a) instructing the radio terminal to terminate flash access preparation upon receipt of a dialed digit from the standard analog terminal; b) storing the dialed digit, appending the dialed digit to previously stored dialed digits; c) sending all the stored dialed digits to the radio terminal with an instruction to initiate flash access preparation; e) wherein steps a–c are repeated for each dialed digit received from the standard analog terminal, as long as the dialed digit is received before the radio terminal sends a call set up request to the network.

* * * * *